July 8, 1952
R. K. FRAZIER
2,602,923
STEREOSCOPIC SYSTEM FOR THREE-DIMENSIONAL
LOCATION OF AIRCRAFT
Filed Sept. 17, 1946
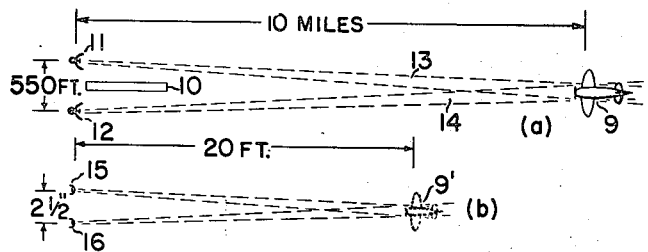
FIG. 1
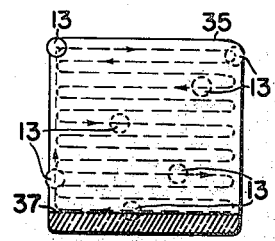
FIG. 3
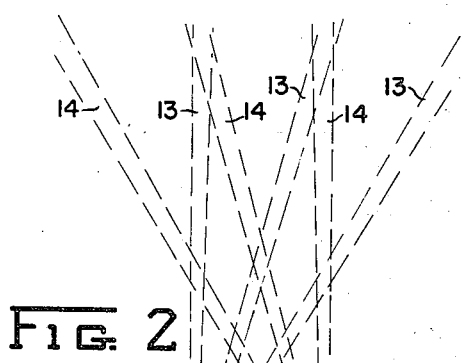
FIG. 2
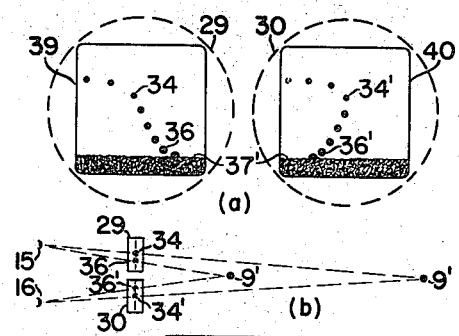
FIG. 4
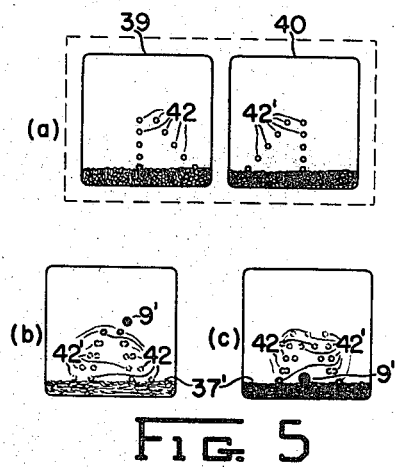
FIG. 5
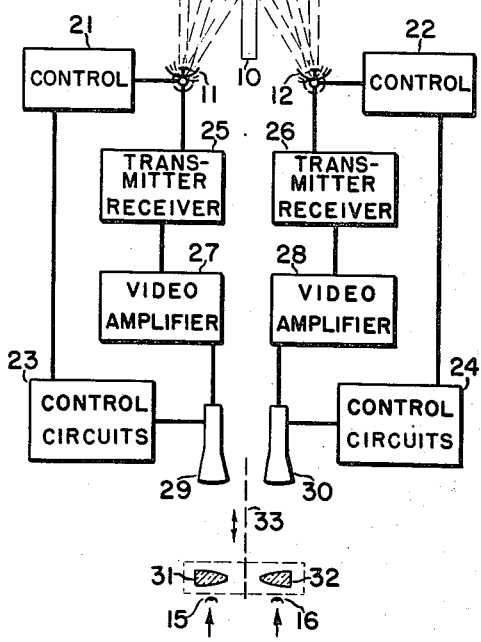
Inventor
RADFORD K. FRAZIER
By Robert T. Killman
Attorney Patented July 8, 1952

2,602,923

UNITED STATES PATENT OFFICE 2,602,923

STEREOSCOPIC SYSTEM FOR THREE-DIMENSIONAL LOCATION OF AIRCRAFT

Radford K. Frazier, Towson, Md., assignor to Bendix Aviation Corporation, Towson, Md., a corporation of Delaware Application September 17, 1946, Serial No. 697,451

2 Claims. (Cl. 343—16)

This invention relates to aircraft landing systems, and more particularly to systems of this type employing ground station radar together with two way radio communication.

Radar is generally used to determine the azimuth and range or the elevation and range of an object in space. To correctly position aircraft in space with the systems heretofore used, two presentations are necessary, requiring two or three operators plus auxiliary personnel to correlate the information and relay it to the aircraft via radio.

In training a person to interpret such radar information it is usually necessary to train his thinking in a channel unfamiliar to his experience. He must be taught to think in terms of coordinates, or chart positioning, for the radar necessarily operates in that manner. Such unfamiliarity invites error of interpretation.

The accuracy of the total information from such an installation depends directly upon the accuracy of each of the several sources from which the information is taken. The chances of misinterpretation and misinformation are therefore directly increased in proportion to the number of operators and information channels employed.

To acquire the accuracy essential in the use of radar for landing aircraft time must be consumed in gathering and checking the information from all its sources and then relaying it to the plane. With the consumption of time in which the information is first obtained by each operator, relayed, coordinated, checked, and then relayed to the pilot of the plane being landed, the accuracy is largely diminished, since a fast moving plane rapidly departs from the position in which the information was first read.

A fair degree of experience and training is necessary to enable an operator to accurately operate and interpret any radar information. The expense of operation and maintenance is proportionally increased by the number of personnel involved in the training of operators for and in the operation of any given equipment.

An object of this invention is to provide a form of radar presentation which is normal to human experience.

Another object of this invention is to provide a form of radar presentation in which the azimuth, elevation, and distance of a remote object are readily observed in one presentation and immediately interpreted as a whole.

Still another object of this invention is to provide a system of radar presentation which requires but one operator to observe, and interpret the positional relation of a remote object to a desired location, and relay the information required to correct its position.

To accomplish these objects, two radars are used with their antennas located each in the same relation to the glide path of an approaching aircraft as one of the eyes of an observer is related to a scale pattern of the approach area, the scale depth of the pattern being determined by the distance between the antennas. The scale pattern is produced by causing the observer to view with each eye, through a stereoscopic viewing means, the indicator presentation of a respective one of the radars. Since both eyes individually observe their respective separate radar presentations at the same time and in relation to each other, the stereoscopic view provides a natural and proper three-dimensional picture of the airplane's position as it approaches the runway. By observation of this picture a single operator can inform the pilot of the approaching craft of his position relative to a desired glide path.

Other objects and advantages will become apparent from a consideration of the following specification when taken in conjunction with accompanying drawing, in which:

Fig. 1(a) is a scale diagram showing the relation of the radar antennas focused upon the landing area and (b) is a similar diagram showing the eyes of the observer viewing the radar picture presentation of the same area;

Fig. 2 is a diagram of a system embodying the invention;

Fig. 3 is a diagram illustrating the scanning pattern of each antenna;

Fig. 4(a) is a plan view of the presentation of each radar, showing indications representing an aircraft in various phases of a complete glide path as seen by each of the two antennas, while (b) is a diagram illustrating the optical principles involved in the stereoscopic viewing of the presentations of Fig. 4(a); and Fig. 5(a) is a view similar to Fig. 4(a) showing the use of glide path markers on the radar indicators, (b) and (c) being views showing images presented to an observer viewing the arrangement of Fig. 5(a).

Referring now more particularly to the drawing, there is shown in Fig. 1(a) and (b) a pair of diagrams illustrating some of the principles employed in the invention. The invention makes use of a pair of radar beam antennas 11 and 12 located at one end and on opposite sides of an aircraft landing area or runway 10, to scan a volume of space traversed by the usual paths of aircraft such as 9 approaching the area for a landing. Energy reflected from the aircraft 9 is received by radar systems associated with each of the antennas 11 and 12 and displayed on respective adjacently located oscilloscopes in accordance with the position of the aircraft 9 in the common volume of space as viewed by the respective antennas.

By viewing the oscilloscopes with a stereoscopic viewing means there is presented to the eyes 15, 16 of an observer a composite image 9' of the oscilloscope indications, the image being formed at an apparent distance from the eyes of the observer. The ratio of this distance to the distance of the aircraft 9 from the antennas 11, 12 is directly proportional to the ratio of the distance between the eyes of the observer to the distance between the antennas.

As shown in Fig. 1, by way of example, the antennas 11 and 12 are positioned 550 feet apart. With an eye spacing of 2½ inches the image 9' of the radar presentation of the aircraft 9 will be formed at an apparent distance of 20 feet from the eyes of the observer when the aircraft is 10 miles distant from the antennas. Reducing the separation of the antennas will lengthen the focal distance of the image and vice versa.

Fig. 2 is a diagram of a complete system embodying the invention, in which the antennas 11 and 12 are controlled by means 21 and 22 respectively to scan the approach area of a landing aircraft. Control circuits 23 and 24 operate in conjunction with control means 21 and 22 respectively to position the video indications upon the oscilloscopes 29 and 30 respectively in accordance with the position of the narrow radiation beams 13 and 14 from the radar antennas 11 and 12. Transmitter-receivers 25 and 26 send and receive radar pulses through antennas 11 and 12 respectively. These pulses are increased by amplifiers 27 and 28 and observed on oscilloscopes 29 and 30 respectively as said video indications. Lenses 31 and 32 are normal stereoscopic lenses so focused as to provide proper stereoscopic observation by the eyes 15 and 16 of the video indications presented on oscilloscopes 29 and 30. A shield 33 totally separates the visual field of lens 31 to oscilloscope 29 from that of lens 32 to oscilloscope 30. The details of the various components of the radar systems being well known, no detailed description thereof is given herein.

Fig. 3 shows the pattern 35 scanned by the narrow radiation beam 13 referred to in Figs. 1 and 2. Beam 14 of said Figs. 1 and 2 follows a similar scan pattern in unison with beam 13. In this instance beam 13 scans horizontally and changes altitude with each successive horizontal scan path until ground level 37 is reached. When such a scan cycle is completed the initial position is resumed and the cycle repeated time after time to maintain coverage of the desired area. Other scan patterns may be used if desired. Scanning may be accomplished by means known to the art.

The electron beams of oscilloscopes 29 and 30 are caused to traverse scanning paths which are identical with those followed by the antennas of their respective radar sets. The techniques and circuits for providing such scanning patterns are known to the art and might, for example, comprise means for applying a zig-zag or pyramidal type of voltage wave form to the horizontal deflection plates of the oscilloscope in synchronism with the horizontal movement of the antenna, together with the application of a saw tooth voltage to the vertical deflection plates in synchronism with the vertical movement of the antenna.

Fig. 4(a) is a front view of oscilloscopes 29 and 30 positioned for stereoscopic viewing, with the picture presentation 39 as seen by the left eye and the picture presentation 40 as seen by the right eye. However, each picture 39 and 40 is a composite of multiple instantaneous views, superimposed in a manner such that the dot-like indications of a landing airplane are seen at various phases of its approach to the landing area. Ground reflections 37' appear at the bottom of each picture.

In stereoscopic viewing the presentations 39 and 40 remain stationary while the eyes move laterally to bring the separate indications seen by each eye to a focus, thus forming an image at an apparent distance determined by the amount of eye movement necessary to establish the focus. Thus, indications spaced widely apart from the adjacent sides of the presentations 39, 40 will form an image at an apparently greater distance in space from the observer than those spaced more closely to the adjacent edges of the presentations. This is illustrated in Fig. 4(b) where the image 9' of the indications 34, 34' of Fig. 4(a) is shown to be more distant than the image 9' of the indications 36, 36'.

In order for the observer to be able to positionally correlate the image of the indications of the aircraft with a desired glide path it is necessary to provide an image indicative of one or more reference positions in space. This may be done by causing one or more reference indications to appear on the presentations 39, 40 at locations such that the eyes of the observer will bring them to focus in an image, in an apparent position in space which is the desired reference position. Then as the aircraft nears this actual position in space, the aircraft indication and the marker indications will simultaneously be focussed into images. These images will have an apparent positional relation in space which is a scale reproduction of the positional relation of the aircraft to the actual reference position in space. By using one or more series of such marker indications a path in space may be outlined along which it is desired that an aircraft should move, and the three dimensional positional relationship of the aircraft to the path may be continuously portrayed.

Fig. 5 illustrates the appearance of a double row of marker indications used to define the lateral limits of a glide path. The marker indications 42 are shown applied to presentation 39 while indications 42' are shown applied to presentation 40. While it is difficult, if not impossible, to properly illustrate the appearance of the image of the glide path formed by the viewing of such indications, the observer will see a double avenue of objects receding into the distance from him and increasing in altitude as they recede.

If an image of an aircraft indication is observed in proximity to a portion of the glide path image, the eyes, in focussing primarily on the image of the aircraft indication, will bring into clear image focus only those marker indications in proximity to the aircraft image. The remainder of the glide path marker indications will appear in the fringes of the observer's vision as discrete objects spread apart as shown in Fig. 5 (b) and (c).

In (b) the image 9' of the aircraft indication is shown above, to the left, and more distant than the remote end of the glide path. The distance relationship is impossible to show in a two dimensional figure, but would be apparent to the observer. The indications representing the distant end of the glide path have been focussed into images, while the indications representing the nearer end of the glide path are not resolved into images but will appear in the fringes of the observer's vision as shown.

In (c) the image 9' of the aircraft indication is shown in the glide path at a distance substantially equal to that of the second pair of marker indications from the nearer end of the glide path. It will be noted that the marker indications of the remote end of the glide path are, in this case, not resolved into images. However, by broadening the focus of the eyes the whole glide path can be visualized in image form, as explained above.

While two rows of dot indications have been shown on each presentation, it should be understood that one row may be used and that other forms of indications, such as lines, may be employed. Dots are considered preferable because they can be made to form images at apparent distances corresponding to exact reference distances in space. For example, they may be made to form images corresponding to mile intervals in space.

The marker indications may be formed electrically on the faces of the oscilloscopes by intensifying, in a known manner, the electron beam of the oscilloscope at selected points during the scan of the antennas. The indications may be otherwise formed as by physically marking them with paint on the face of the oscilloscope, or on a transparent screen placed in front of the oscilloscope.

The invention is particularly adaptable to use, in connection with a beacon transponder in the aircraft. In such case the indication of the aircraft will be greatly intensified, and the intensity may be regulated in such a manner as to render invisible the background reflections present in the usual radar presentation.

The invention may also be used with forms of space illumination utilizing other forms of energy, such for example, as infra red light.

It will be evident from the foregoing that this invention is not limited to the specific circuits and arrangements of parts shown and disclosed herein for illustration, but that the underlying concept and principle of the invention are susceptible of numerous variations and modifications coming within the broader scope and spirit thereof as defined by the appended claims. The specification and drawing are accordingly to be regarded in an illustrative rather than a limiting sense.

What is claimed is:

1. Means for establishing the location of an aircraft relative to a desired glide path comprising a pair of radio pulse echo systems each having an antenna, said antennas being located at opposite sides of one end of said glide path and scanning a common volume of space including said glide path, an oscilloscope indicating means for each of said systems, each of said oscilloscopes presenting upon its screen indications of energy reflected from objects in said common volume of space, the screens of said oscilloscopes being located in side by side coplanar relation, stereoscopic viewing means for viewing said screens, said screens and viewing means being so located that the indications on said screens of an aircraft in said volume of space will be focused by the eyes of an observer into a single image having an apparent location in space which is a scale replica of the actual location of said aircraft, and a plurality of horizontally disposed pairs of discrete marker indications formed on each of said screens, each pair of said marker indications on one screen having a corresponding pair on the other of said screens, said marker indications being so located on said screens as to be focused by the eyes of an observer into an overall image comprising a double row of indications defining the boundaries of a scale replica of said desired glide path.

2. Means for presenting to an observer an optical representation of an aircraft approaching a landing area, together with an optical representation of the boundaries of a glide path associated with said area, said means comprising a pair of radio pulse echo systems, each of said systems having an antenna, said antennas being located in laterally spaced relation adjacent said area, means causing said antennas to scan a common volume of space including said glide path, a cathode ray oscilloscope included in each of said systems and presenting upon its screen indications of energy reflected from objects in said volume of space, said oscilloscopes being located with their screens in side by side relation, means causing the electron beam of each of said oscilloscopes to follow the scanning pattern of the antenna of the system of which it is a part, a stereoscopic viewing means positioned for the stereoscopic viewing of said screens, and a plurality of discrete spots formed on each of said screens, the size and location of each of said spots remaining unchanged during the approach of an aircraft to said landing area, each of said spots being laterally displaced on its screen from the position occupied on the other screen by a corresponding spot, said displacement being a function of a selected range, the spots on each screen being arranged to define a smooth curve, and the displacements of succeeding spots along said curve with respect to their corresponding spots on the other of said screens varying in a progressive manner whereby the spots of both said screens when viewed through said viewing means define to the observer a three dimensional glide path indication against which the indication of energy reflected from an aircraft in said common volume of space may be visually compared.

RADFORD K. FRAZIER.

REFERENCES CITED

The following references are of record in the file of this patent:

UNITED STATES PATENTS

| Number | Name | Date |
|---|---|---|
| 2,231,929 | Lyman et al. | Feb. 18, 1941 |
| 2,279,246 | Podliasky | Apr. 7, 1942 |
| 2,301,254 | Carnahan | Nov. 10, 1942 |
| 2,405,231 | Newhouse | Aug. 6, 1946 |
| 2,406,798 | Burroughs | Sept. 3, 1946 |
| 2,408,050 | De Rosa | Sept. 24, 1946 |
| 2,417,446 | Reynolds | Mar. 18, 1947 |
| 2,426,189 | Espenschied | Aug. 26, 1947 |
| 2,426,979 | Ayers | Sept. 9, 1947 |
| 2,444,578 | Neufeld | July 6, 1948 |
| 2,449,542 | Ayres et al. | Sept. 21, 1948 |
| 2,455,456 | Whittaker | Dec. 7, 1948 |
| 2,477,651 | Ranger | Aug. 2, 1949 |
| 2,502,974 | McElhannon | Apr. 4, 1950 |
| 2,514,828 | Ayres | July 11, 1950 |
| 2,538,800 | Ranger | Jan. 23, 1951 |
| 2,540,121 | Jenks | Feb. 6, 1951 |
| 2,543,065 | Salinger | Feb. 27, 1951 |